United States Patent Office 2,814,468
Patented Nov. 26, 1957

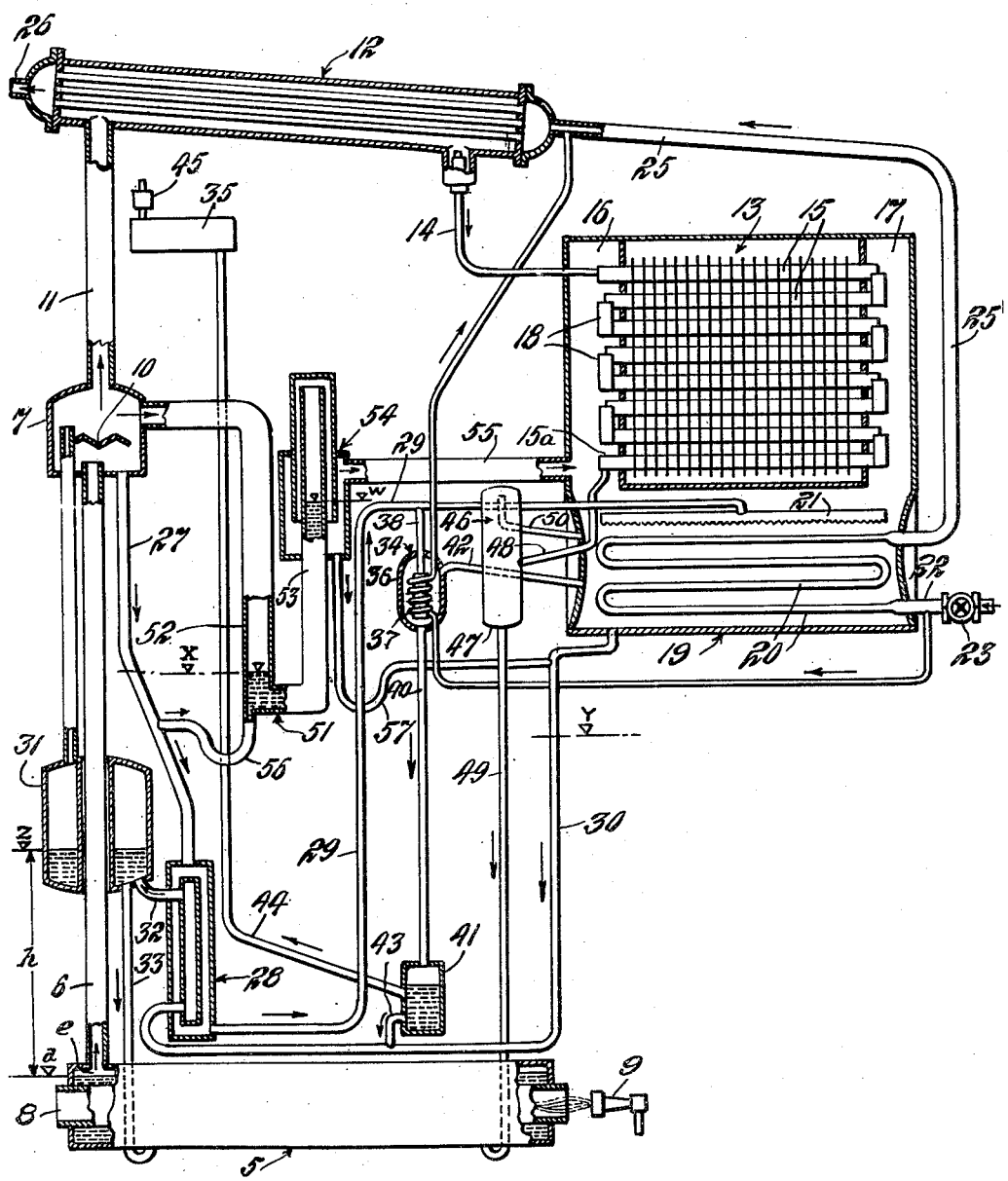

2,814,468

AIR CONDITIONING

Norton E. Berry, St. Louis, Mo., assignor, by mesne assignments, to Arkla Air Conditioning Corporation, a corporation of Delaware Continuation of abandoned application Serial No. 306,241, August 25, 1952. This application October 3, 1955, Serial No. 538,118

7 Claims. (Cl. 257—9)

This application is a continuation of my prior application Serial No. 306,241, filed August 25, 1952, and allowed April 18, 1955, now abandoned, and relates back to said application for all common subject matter.

The present invention relates to the art of heating and cooling. More particularly, this invention relates to the art of air conditioning by means of an absorption refrigerating system of the two pressure type wherein the same heat exchanger serves as both a heater and a cooler.

In my copending application for United States Letters Patent, Serial No. 286,677, filed May 8, 1952, now abandoned, which copending application is a continuation of and relates back for common subject matter to my abandoned application Serial No. 703,788, filed October 17, 1946, I disclose and claim an air conditioning system of the type wherein a solution trap is provided between the high and low pressure sides of a refrigerating system for controlling the operation of the system on both heating and cooling cycles. During cooling cycles of operation the trap is maintained full of liquid, which liquid blocks the flow of vapor therethrough with the result that the vapor flows to the condenser wherein it is condensed to liquid. The liquid flows from the condenser into the evaporator wherein it is vaporized producing the desired cooling. Whereas, during heating cycles of operation, the pressure in the high side of the system is raised to the point that the liquid is removed from the trap and vapor passes therethrough from the generator to the evaporator wherein the vapor is condensed and produces the desired heating effect. With this type of apparatus, the corrosion rate increases with temperatures, approximately doubling for each 10° C. rise, and it is desirable that the generator be operated at the lowest practical temperature and still do a good heating job.

It is therefore an object of this invention to provide a heating and cooling system of the above type wherein the pressure drop, on the heating cycle, between the generator and evaporator is materially reduced, which, in turn permits the generator to be operated at much lower temperatures than was feasible heretofore.

This instant invention is directed particularly to improving the operation of a heating and cooling system of the type disclosed in Fig. 2 of my above copending application.

By the instant invention, a separate by-pass conduit is provided which forms a path for flow of hot generator vapor to the evaporator on heating cycle operation. This by-pass conduit includes a liquid trap which when filled with liquid blocks the flow of vapor therethrough during cooling cycle operation. Absorption liquid from which refrigerant vapor has been expelled flows into and maintains the liquid trap during cooling cycle operation. During heating cycle operation, after the trap has been blown of liquid due to a momentary rise in the pressure difference between the high and low pressure sides of the system resulting from the cutting off of the supply of cooling medium to the condenser, absorption liquid is diverted from its normal cooling cycle path and flows into the liquid trap in a manner such that the high velocity vapor passing from the generator to the evaporator carries the weak absorption liquid through the trap with a pressure differential between the high and low pressure sides of the system sufficient only to carry the liquid through the trap. In this manner once the trap is blown of liquid, the generator pressure and temperature fall appreciably. Also in accordance with this invention, the weak absorption liquid is fed into the trap through a separate conduit arranged in a manner to obviate convection currents which otherwise might result in hot solution being carried through the trap on the cooling cycle followed by flashing and partial pumping of solution on the low pressure side of the trap. Furthermore, in accordance with this invention, the weak absorption liquid that is carried through the trap is separated from the carrying vapor and returned to the generator without entering the evaporator or the absorber.

The invention, together with the above and other objects and advantages, is set forth in more technical detail in the following description and accompanying drawing in which the single figure shows more or less diagrammatically an apparatus for heating and cooling in accordance with this invention.

Referring now to the drawing, for purposes of illustration, I have incorporated my invention in an absorption refrigerating system of the two pressure type having a single vapor liquid-lift, generally as illustrated and described in my copending application for United States Letters Patent No. 2,625,800, issued January 20, 1953. The system operates at a partial vacuum and contains, for example, a saline refrigerant-absorbent solution, in which water is the rferigerant and lithium chloride, lithium bromide or a mixture of the two is the absorbent.

The vapor liquid-lift comprises a vapor expelling vessel or generator 5, a lift tube 6 extending upwardly from the top of the generator and a separating chamber 7 at the upper end of the lift tube. The generator 5 is illustrated in the form of a horizontally arranged cylindrical vessel having an axial flue 8. A source of heat such as a gas burner 9 heats the interior of the flue which, in turn, heats the solution in the generator to expel refrigerant vapor therefrom. It is to be understood, however, that the generator 5 may have other shapes and the solution therein may be heated by any suitable heating means.

In the illustrated embodiment, the lift tube 6 is connected to the generator 5 so that its lower end is flush with the top wall of the generator but this tube may project a short distance into the generator. The upper end of the lift tube 6 extends through the bottom wall of the separating chamber 7, which chamber contains baffles 10 for separating vapor from absorption solution.

A conduit 11 connects the top of the separating chamber 7 to a suitable condenser 12 and the opposite end of the condenser is connected to an evaporator or heat exchanger 13 by a conduit 14 having an orifice therein, as described and claimed in my United States Patent No. 2,563,575, issued August 7, 1951. The orifice maintains the difference in pressure between the high and low pressure sides of the system. The evaporator 13, which operates as a cooler on cooling cycles and as a heater on heating cycles, comprises a plurality of substantially horizontal tubes 15 having their opposite ends open and projecting into spaced headers 16 and 17. Cups 18 are provided at opposite ends of alternate tubes and underline one end of the next higher tube so that liquid refrigerant continuously flows by gravity from each tube to the next lowermost tube from the top to the bottom of the evaporator. The lower ends of the headers 16 and 17 open into an absorber 19 in the form of a cylindrical vessel. Mounted in the absorber 19 is a bank of vertically arranged cooling coils 20 providing gas and liquid contact surfaces and a liquid distributor 21 for delivering absorption solution for downward flow over the surface of the coils. Cooling water is supplied through a conduit 22, having a valve 23 therein, for flow through the coils 20 in the absorber 19 and from the absorber, the water flows through a conduit 25 to the condenser 12. The cooling water is discharged from the condenser through a conduit 26.

During cooling cycles of operation, absorption solution weak in refrigerant flows from the separating chamber 7 through a solution circuit comprising a conduit 27 connecting the bottom of the separating chamber 7 to an outer passage of a liquid heat exchanger 28 and a conduit 29 connecting said passage of the heat exchanger to the liquid distributor 21. Liquid strong in refrigerant is delivered from the bottom of the absorber 19 through a conduit 30 to an inner passage of the liquid heat exchanger 28 and flows from the heat exchanger to a reservoir or leveling vessel 31 through a conduit 32. A conduit 33 connects the bottom of the leveling vessel 31 to the bottom of the generator 5. The leveling vessel 31 is adapted to receive and hold a body of absorption solution therein to maintain a hydrostatic column of the solution on the generator 5 of a predetermined and substantially constant height, the lateral dimensions of the vessel being such that variations in operating conditions of the system will not substantially vary the height of the hydrostatic reaction head. During cooling cycle operation of the system, columns of solution will stand in conduits 29 and 30 to balance the difference in pressure between the generator 5 and absorber 19, liquid standing at some level $x$ in conduit 27 connected to the conduit 29 through heat exchanger 28, at level $y$ in conduit 30 and at level $z$ in the leveling vessel 31.

A purge device 34 generally similar to that illustrated and described in the United States Letters Patent to Lowell McNeely No. 2,473,384, issued June 14, 1949, is provided for withdrawing surplus non-condensable gases from the absorber 19 and delivering them to a storage vessel 35. Briefly, the purge device 34 includes an auxiliary absorber 36 having a cooling coil 37 therein which is connected between the cooling water conduits 22 and 25. Weak absorption solution is delivered to the auxiliary absorber from the conduit 29 through a conduit 38 and enriched absorption solution flows from the bottom of the auxiliary absorber through a fall tube 40 into the top of a gas trap 41. A conduit 42 connects the auxiliary absorber 36 to the main absorber 19 for flow of vapor and non-condensable gas to the auxiliary absorber. In the auxiliary absorber the vapor is absorbed by the weak absorption liquid which flows over the cooling coil 37 freezing the non-condensable gas, which gas is trapped between slugs of enriched absorption liquid flowing downward in the fall tube 40 and delivered to the gas trap 41. The enriched absorption liquid flows from the gas trap 41 through a conduit 43 into the conduit 30 leading from the main absorber 19 to the generator 5. A conduit 44 connects the gas trap 41 to the purge receiver 35.

The non-condensable gas collects in the upper part of the gas trap 41 until so much gas accumulates therein that the level of absorption solution is depressed to the point at which conduit 44 opens into the trap, after which, any excess gas pumped into trap 41 passes therefrom through conduit 44 to the purge receiver 35. Each time the unit shuts down, slugs of liquid in the fall tube 40 fall into the gas trap 41 and the volume of non-condensable gas trapped in the gas trap escapes upwardly through the fall tube 40, auxiliary absorber 36 and conduit 42, back to the main absorber 19. When the unit is again started up, the absorption solution trickling downward over the pipe coil 20 in the main absorber entraps a portion of the non-condensable gas into the absorption solution, which non-condensable gas is conveyed by the absorption solution from the main absorber through conduit 30 and interconnecting elements, to the generator 5. In the generator, the non-condensable gas forms vapor nuclei which promote quiet boiling of the refrigerant-absorbent solution and thereby reduce superheat and its ensuing noise. Any excess non-condensable gas that finds its way into the main absorber, beyond that picked up by absorption solution therein, is conveyed therefrom through conduit 42, auxiliary absorber 36 and fall tube 40, into the gas trap 41, as explained above. The gas trap 41 is of such size that an optimum amount of non-condensable gas is retained in the system at all times. Any excess of non-condensable gas beyond this optimum amount is conveyed through conduit 44 to the purge receiver 35, from whence such excess gas may be exhausted from time to time by a purge pump 45.

A concentration control 46 of the type illustrated in the United States Letters Patent to Lowell McNeely No. 2,465,904 issued March 29, 1949, is provided for varying the concentration of the absorption solution to compensate for variations in operating conditions during cooling cycles of operation. This concentration control includes a vessel or reservoir 47 having an inlet conduit 48 connected to the lowermost tube 15a of the evaporator and an outlet conduit 49 connected to the bottom of the generator 5. A pressure equalizing conduit 50 connects the top of the concentration vessel to the main absorber 19. The concentration control operates in response to variations in the difference in pressures in the high and low pressure sides of the system to either store or deliver liquid refrigerant for varying the concentration of the absorption solution in accordance with varying conditions of operation such as cooling water temperature. The concentration control vessel is located above the liquid level $z$ in the leveling vessel 31 a distance sufficient to maintain a column of liquid refrigerant in the conduit 49 and in the control vessel of a height to balance the difference in pressure between the absorber 19 and the generator 5.

At the beginning of a period of operation absorption solution will stand at some level $z$ in both the leveling vessel 31 and lift tube 6. When heat is applied to the flue 8 of the generator 5 by the gas burner 9, refrigerant vapor will be expelled from solution in the generator and after an initial preheating of the solution vapor will be expelled at a rate proportional to the amount of heat supplied. The vapor will ascend through the lift tube 6 at an increasing rate and the resistance to the flow of vapor through the tube due mainly to frictional drag on the liquid therein, causes a pressure drop through the tube and a resultant increase in pressure at the bottom of the tube. This, in turn, depresses the liquid level in the generator and thus decreases the quantity of liquid entering the tube until an equilibrium condition is reached when liquid is depressed to the approximate level $d$ below the end of lift tube 6 in generator 5 to produce a pressure or hydrostatic reaction head $h$ of solution between the levels $z$ and $d$ which balances the forces opposing the flow of vapor through the tube. Vapor then flows upwardly from said space $e$ through the lift tube 6 in continuous vapor phase at high velocity and at substantially the same rate as it is expelled from solution in the generator 5.

The constant boiling and agitation of the solution in the generator breaks up a portion of the liquid into small parts, probably in the form of a foam, in the space $e$ which is drawn into the base of the lift tube 6 with vapor. The liquid, in whatever form, is coalesced into small droplets in the lift tube 6 which are carried upwardly through the tube with the high velocity vapor. It has been found that with a proper size of lift tube that liquid is lifted at a controlled, reproducible rate. The vapor with the droplets of liquid therein enters the separating chamber 7 where the droplets of liquid are separated from the vapor by the baffles 10. Vapor then flows through conduit 11 into the condenser 12 where it is liquefied. The liquefied refrigerant flows from the condenser 12 through the conduit 14 into the top of the evaporator 13, an orifice in the conduit 14 maintaining the pressure difference between the condenser and the evaporator. The liquid refrigerant then flows by gravity through successive tubes 15 from the top to the bottom of the evaporator 13. Any liquid refrigerant that reaches the outlet end of the bottom tube 15a of the evaporator flows therefrom through conduit 48 into the concentration control vessel 47.

During cooling cycles of operation, absorption solution weak in refrigerant or, in other words, concentrated salt solution which is separated from refrigerant vapor in the chamber 7 flows by gravity to the liquid distributor 21 in the absorber 19 in a path of flow including conduit 27, the outer passage of the liquid heat exchanger 28 and conduit 29. The absorption solution is divided by the liquid distributor 21 for gravity flow over the cooling coils 20 in the absorber 19. Due to the absorption of refrigerant vapor in solution in the absorber 19, the vapor pressure of the refrigerant in the evaporator tubes 15 is reduced causing the refrigerant to evaporate at a low pressure and temperature to cool air or other medium flowing over the exterior of the tubes. The refrigerant vapor flows from the evaporator tubes 15 into the headers 16 and 17, and from there the vapor flows into the absorber 19 where it is absorbed in the solution.

Absorption solution rich in refrigerant or, in other words, dilute salt solution flows from the bottom of the absorber 19 to the reservoir 31 in a path of flow including the conduit 30, the inner passage of the liquid heat exchanger 28 and conduit 32, the difference between the level $y$ in conduit 30 and level $z$ in the leveling vessel 31 representing the difference in pressure between the high and low pressure sides of the system. The absorption solution then flows by gravity from the leveling vessel 31 to the base of the generator 5 through a conduit 33. The liquid column $h$ between $z$ and $d$ represents the reaction head balancing the resistance forces in the lift tube 6. The absorption liquid delivered to the generator 5 then repeats the cycle as previously described.

The above cooling cycle operation is generally the same as that described in my above United States Patent No. 2,625,800. Coming now to the instant invention, in accordance with this invention, I provide a by-pass conduit between the high and low pressure sides of the apparatus comprising a separate liquid trap 51 between the separating chamber 7 and the evaporator or heat exchanger 13 for flow of hot generator vapor to the evaporator on heating cycles of operation. This trap 51 includes a downleg 52 connected to the top of the separating chamber 7, an upleg 53 opening into an auxiliary separating chamber 54 and a vapor conduit 55 connecting the auxiliary separating chamber to the header 16 of the evaporator. Weak solution is fed into the trap 51 from the weak solution conduit 27 through a small liquid trap 56. The presence of the trap 56 in the line between the conduit 27 and the trap 51 minimizes the flow of hot solution to the trap 51 by convection during cooling cycles of operation. This is desirable since any such flow of hot solution may result in some flashing of solution in the upleg 53 with resultant loss of uncondensed refrigerant vapor during cooling cycles of operation. A liquid trap 57 connects the auxiliary separating chamber 54 to the conduit 30 leading from the bottom of the absorber 19.

When the system is operating on a cooling cycle with the highest practical temperature of cooling water flowing from the conduit 22 into and through the absorber cooling coil 20 and from there through the conduit 25 into and through the condenser 12, the solution level in the downleg 52 of the trap 51 will be just above the bottom of the trap as indicated at $x$ corresponding substantially to the effective solution level in the weak solution conduit 27 leading from the vapor separating chamber 7.

The solution level in the upleg 53 will generally be that of the top of the weak solution conduit 29 leading to the absorber distributor 21. However, under certain conditions the solution densities involved may be such that this level will be somewhat above or below this point. Accordingly, the upleg 53 of the trap 51 is sufficiently extended to prevent blowing of the trap under unusual conditions of cooling cycle operation.

During a heating cycle of operation of the system, the valve 23 in the water cooling line 22 is closed, either manually or automatically, so that cooling water does not flow through the cooling coil of the absorber or condenser. Now, as the high side pressure rises above the maximum allowed on cooling cycle operations, the trap 51 is blown of liquid and vapor passes from the separating chamber 7 through the downleg 52 into and through the trap 51, through the upleg 53 into the auxiliary vapor separating chamber 54, and through conduit 55 into the heeader 16 of the evaporator 13, which evaporator now functions as a heating element.

At the same time, weak solution flows from conduit 27 through the liquid trap 56 into the bottom of the trap 51, through which it is carried by means of the flowing vapor through the upleg 53 and into the auxiliary separating chamber 54, where the liquid is separated from the generator vapor. The solution flows from the bottom of the auxiliary separating chamber 54 through the trap 57 into the conduit 30 leading from the bottom of the absorber 19. The solution flows back to the generator 5 through conduit 30, the inner passage of the liquid heat exchanger 28, conduit 32, leveling vessel 31 and conduit 33.

The effect of the carrying of solution through the trap 51 in the above manner is to reduce the pressure difference between the high and low pressure sides of the system from that of the maximum provided for on cooling cycles of operation to only that required as reaction head to effect the carrying of the solution through the trap 51 on heating cycles of operation. It has been found in practice that this pressure difference can thus be reduced by at least 60% over previous designs. The use of the auxiliary separating chamber 54 and the connecting trap 57 makes it possible to introduce the hot generator solution into the conduit 30 without contacting the cooling coils 20 in the absorber 19.

The hot generator vapor that is introduced into the header 16 of the evaporator passes into and through the evaporator tubes 15 wherein the vapor is condensed giving up its latent heat of condensation to air or other media that passes over the exterior of the tubes thereby heating such media. The condensate formed in the evaporator tubes flows from the lowermost of said tubes through the conduit 48 into the concentration control vessel 47 and from there the condensate flows through the conduit 49 to the bottom of the generator 5.

To shift from a heating cycle to a cooling cycle of operation all that is necessary is that the control valve 23 in the water cooling line 22 be open for flow of water through the absorber cooling coil and through the condenser so that now the vapor flowing from the generator is condensed in the condenser, the pressure in the high side of the system is reduced and the liquid trap 51 is again established whereupon the flow of vapor and solution through the system is the same as that described above in connection with the cooling cycle operation. In other words the system may be shifted from a heating cycle to a cooling cycle and from a cooling cycle to a heating cycle by merely opening or closing the valve 23 in the water line 22.

It is to be noted that, although the upleg 53 of the trap 51 extends an appreciable distance above the level $w$ at which liquid discharges from conduit 29 into the absorber distributor 21 during cooling cycles of operation, no liquid will discharge from this conduit into the absorber distributor during heating cycles of operation. This follows from the fact that during heating cycles of operation the fluid passing through the upleg 53 of the trap 51 is mostly vapor and therefore much lighter than the liquid in the conduit 29. By the same reasoning, during cooling cycles of operation, except for occasional flashing in the upleg 53, liquid will stand at substantially the level $w$ in this leg of the trap and liquid will overflow from conduit 29 into the absorber distributor 21.

Recapitulating, during cooling cycles of operation vapor generated in the generator 5 passes upward through the vapor lift 6 lifting droplets of weak absorption solution therewith into the separating chamber 7. The vapor separates from the weak absorption liquid and flows through conduit 11 into the condenser 12 wherein the vapor is condensed into liquid and the liquid flows through conduit 14 into and through the evaporator tubes 15, which tubes now function as a cooler to cool air or other media flowing thereover. The weak absorption solution flows from the separating chamber 7 through conduit 27, the outer passage of the liquid heat exchanger 28 and conduit 29 into the distributor 21 of the absorber 19. The absorption liquid flows downward over the absorber cooling coil 20 absorbing refrigerant vapor which passes from the headers 16 and 17 into the absorber, and the strong absorption liquid flows from the absorber through conduit 30, the inner passage of the heat exchanger 28, conduit 32, leveling vessel 31 and conduit 33 back to the generator 5. The fluids in trap 51 and by-pass conduits between the separating chamber 7 and the evaporator 13 stand more or less dormant during the above cooling cycle operation.

During heating cycle operations, the liquid is blown from trap 51 into the auxiliary separating chamber 54 and generator vapor passes from the separating chamber 7 through trap 51, through the upleg 53 into the separating chamber 54 and from there the vapor flows through conduit 55 into the headers 16 of the evaporator. From the header 16, the generator vapor passes through the tubes 15 of the evaporator, which tubes now function as heating elements to heat air or other media passing over the tubes. The vapor is condensed in the evaporator tubes and flows as liquid from the lowermost tube through conduit 48 into concentration control vessel 47 and from there the liquid flows through conduit 49 into the bottom of the generator 5. The weak absorption liquid lifted by the vapor lift 6 into the separating chamber 7 flows therefrom through the upper portion of conduit 27 and trap 56 into the trap 51 wherein this absorption liquid is picked up by the high velocity vapor flowing through the trap 51 and carried through the upleg 53 into the separating chamber 54 from whence this liquid flows through trap 57 into conduit 30 leading from the bottom of the absorber 19. This liquid flows through conduit 30, the inner passage of the liquid heat exchanger 28, conduit 32, leveling vessel 31 and conduit 33 back to the bottom of the generator 5. During heating cycles of operation fluids in conduit 11, condenser 12 and conduit 14, as well as the lower portion of conduit 27, the outer passage of the liquid heat exchanger 28, conduit 29 and the absorber distributor 21 stand more or less dormant.

Without further description it is thought that the features and advantages of the invention will be readily apparent to those skilled in the art to which this invention appertains, and it will, of course, be understood that changes in form, proportions and minor details of construction may be resorted to without departing from the spirit of the invention and scope of the claims.

What is claimed is:

1. In a heating and cooling system, an absorption refrigerating apparatus of the two pressure type charged with a refrigerant-absorbent solution and including a generator, a condenser, an evaporator which functions as a cooler on cooling cycles and as a heater on heating cycles, an absorber and conduits interconnecting said elements to provide circuits for flow of refrigerant medium and absorption solution and for regulating flow of such fluids therethrough, a by-pass connected between the high and low pressure sides of the apparatus for flow of refrigerant vapor to the evaporator during heating cycles, means in the by-pass for blocking flow of refrigerant vapor therethrough during cooling cycle operation, and a separate connection between the by-pass and an absorption solution circuit connected to the by-pass in a manner that during heating cycles the flow of refrigerant vapor through the by-pass causes flow of absorption solution through said separate connection for diverting all absorption solution flowing from the generator in a path of flow differing on heating cycles from that on cooling cycles whereby said absorption solution by-passes the absorber and the pressure difference between the generator and evaporator is lower on heating cycles than the maximum pressure difference on cooling cycles.

2. A heating and cooling system as set forth in claim 1 wherein the separate connection between the by-pass and the absorption solution circuit includes means for minimizing the flow of absorption solution therethrough by convection currents during cooling cycle operation.

3. A heating and cooling system as set forth in claim 1 wherein the means in the by-pass connection for blocking flow of refrigerant vapor therethrough during cooling cycle operation includes liquid column forming means and means therein to prevent removal of liquid therefrom due to changes in liquid densities therein during cooling cycle operation.

4. A heating and cooling system as set forth in claim 1 which includes a first vapor separating chamber connected between the generator and the condenser, a second vapor separating chamber in the by-pass connection, a vapor conduit connected between the second separating chamber and the evaporator and a liquid conduit connected between the second separating chamber and a conduit in an absorption solution circuit leading from the absorber to the generator.

5. In a closed heating and cooling apparatus of the two-pressure type containing a solution of refrigerant and absorbent and comprising a generator and condenser in the high-pressure side, a heat exchanger and absorber having absorption surfaces in the low-pressure side and conduits interconnecting said elements to provide circuits for flow of refrigerant and absorption solution and for regulating the flow of such fluids therethrough, said circuits including a first path of flow for refrigerant from the generator to the heat exchanger and including the condenser and means for maintaining the difference in pressure between the high and low pressure sides of the apparatus, a second path of flow for absorption solution from the generator to the absorber for distribution over the absorption surfaces therein and then from the absorber back to the generator and including means for maintaining the difference in pressure, the combination with such apparatus of a by-pass conduit forming a third path of flow between the high and low pressure sides of the apparatus and having a liquid trap and separating chamber therein, said by-pass conduit having connections to the first path of flow at both the high and low pressure sides of the apparatus, a connection between the second path of flow and trap at the high pressure side of the apparatus and a connection between the separating chamber and second path of flow at the low pressure side of the apparatus below the absorption surfaces in the absorber.

6. In a closed heating and cooling apparatus of the two-pressure type containing a solution of refrigerant and absorbent and comprising a generator and condenser in the high pressure side, a heat exchanger and absorber in the low pressure side and conduits interconnecting said elements to provide circuits for flow of refrigerant and absorption solution and for regulating the flow of such fluids therethrough, said circuits including a first path of flow for refrigerant from the generator to the heat exchanger and including the condenser and means for maintaining the difference in pressure between the high and low pressure sides of the apparatus, a second path of flow for absorption solution from the generator to the absorber and from the absorber back to the generator and including means for maintaining the difference in pressure, the combination with such apparatus of a by-pass conduit through which refrigerant vapor and absorption solution flow from the high pressure to the low pressure sides of the apparatus under certain operating conditions, said by-pass conduit being constructed to provide a path of flow for refrigerant vapor which by-passes the means for maintaining the difference in pressure in the first path of flow for refrigerant and a path of flow for absorption solution which by-passes the absorber in the second path of flow for absorption solution.

7. In a closed heating and cooling apparatus of the two pressure type containing a solution of refrigerant and absorbent and comprising a generator and condenser in the high pressure side, a heat exchanger and absorber in the low pressure side and conduits interconnecting said elements to provide circuits for flow of refrigerant and absorption solution and for regulating the flow of such fluids therethrough, said circuits including a first path of flow for refrigerant from the generator to the heat exchanger and including the condenser and means for maintaining the difference in pressure between the high and low pressure sides of the apparatus, a second path of flow for absorption solution from the generator toward the absorber and from the absorber toward the generator and including means for maintaining the difference in pressure, the combination with such apparatus of a by-pass conduit comprising a liquid trap having a liquid column forming means and a separating chamber, said by-pass conduit having connections to the first path of flow at both the high and low pressure sides of the apparatus, a connection between the liquid trap and portion of the second path through which solution flows toward the absorber and a connection between the separating chamber and portion of the second path of flow through which solution flows toward the generator.

References Cited in the file of this patent
UNITED STATES PATENTS 2,749,095   Anderson et al. _____ June 5, 1956